United States Patent

Hearn et al.

[11] Patent Number: 4,622,516
[45] Date of Patent: Nov. 11, 1986

[54] MAGNETIC TACHOMETER FOR DISK DRIVES

[75] Inventors: Patrick L. Hearn, Acton, Mass.; Charles M. Riggle, Colorado Springs, Colo.; Shyam C. Parikh, Stow; Kenneth F. Veseskis, Hudson, both of Mass.

[73] Assignee: Digital Equipment Corporation, Maynard, Mass.

[21] Appl. No.: 505,047

[22] Filed: Jun. 16, 1983

[51] Int. Cl.$^4$ .............................................. G01P 3/46
[52] U.S. Cl. .................................... 324/163; 360/106; 360/109
[58] Field of Search ............... 324/163, 164, 166, 173, 324/174, 207; 360/97, 86, 104, 105, 106, 109; 310/36, 38

[56] References Cited

U.S. PATENT DOCUMENTS

| | | | |
|---|---|---|---|
| 4,150,314 | 4/1979 | Zabler et al. | 310/155 |
| 4,150,407 | 4/1979 | Dijkstra | 360/106 |
| 4,196,456 | 4/1980 | Manzke et al. | 360/106 |
| 4,346,416 | 8/1982 | Riggle et al. | 360/97 X |
| 4,375,070 | 2/1983 | Isozaki et al. | 360/105 X |

*Primary Examiner*—Reinhard J. Eisenzopf
*Assistant Examiner*—Jack B. Harvey
*Attorney, Agent, or Firm*—Cesari and McKenna

[57] ABSTRACT

A magnetic tachometer for generating a signal as a function of the velocity of a transducer positioning arm in a disk drive. The tachometer is formed by a pair of fixed parallel coils separated by a distance sufficient to allow a magnet, attached to a counterbalance portion of the rotary positioning arm, to move therebetween and thus to generate a voltage as a function of the velocity of the magnet. The coils are each wound over a thin armature member which is saturated by the magnet's magnetic field and they are differentially coupled to produce common mode rejection.

6 Claims, 8 Drawing Figures

4,622,516

MAGNETIC TACHOMETER FOR DISK DRIVES

BACKGROUND OF THE INVENTION

This invention relates to tachometers for monitoring the velocity of the read/write heads in a disk drive, and more specifically to tachometers for monitoring the velocity of a rotary actuator arm of a disk drive.

In general, a closed loop disk drive uses a servo system to accurately position the read/write head at a requested track. In some applications the servo system uses a dedicated disk surface on which servo information is written. In these applications no tachometer is needed, since the dedicated servo surface provides continuous feedback information. Obviously such systems have the disadvantage of having one less disk surface available for data storage, and for systems having one or two disks this represents a substantial storage loss. To alleviate this data storage loss while maintaining the accuracy of the servo system, some applications use a tachometer, coupled to the head actuator, to relay velocity information to the servo system. The servo system then uses the head velocity signal as the continuous servo signal, this information being supplemented with fine positioning information stored on a small portion of each sector of each track and normally referred to as embedded servo information.

Generally, a disk drive may use either linear or rotary actuator positioning means. In the linear case, the actuator arm, and therefore the head, is moved linearly along a radius of the rotating disk, while in the rotary case, the actuator arm rotates along an axis parallel to the disk spindle at a point close to the outside rim of the disk. In either case, a suitable tachometer must be used.

Known linear tachometer designs for disk drive applications are not directly applicable to rotary actuator designs. Generally magnetic tachometer designs are very susceptible to stray magnetic fields, and optical tachometers using a glass scale are too expensive.

The available rotary tachometers are not designed for disk drive applications. They range from simple generators that measure the speed of the rotating shaft to more sophisticated optical decoders. Unfortunately they are either not sensitive enough, due in part to the lack of noise rejection and adequate bandwidth, or are too expensive for disk drive applications. Cost is an important factor in the manufacture of reasonably priced disk drives, thus an inexpensive tachometer is needed, provided that the required bandwith and noise rejection can be achieved.

SUMMARY OF THE INVENTION

The present invention provides for an inexpensive magnetic tachometer which produces a bandwidth and noise rejection particularly suitable for disk drive applications.

An elongated actuator arm, having first and second end portions opposite each other, carries an electromagnetic transducer on the first end portion, the transducer being adapted to be used over a rotating magnetic disk. A magnet is disposed on the second end portion. A substantially longitudinal conductive coil is disposed adjacent the magnet at a position such that the path defined by the magnet throughout the range of motion of the actuator arm remains within an area defined by the projection of the coil's outer dimensions in the plane of the path of the magnet.

In the preferred embodiment, two longitudinal coils are disposed parallel to each other to define an elongated region in which a magnet, positioned on the counter-balance end of a rotary actuator arm, is free to move as the arm rotates through selected positions. The coil assembly is rigidly supported on a frame mounted on the casing of the servo motor. The structure of the coil assembly helps to reduce costs, since the two coils can be simultaneously wound over a single elongated armature/filler subassembly. This subassembly is then snapped in two and bent over spacers to form a rigid coil assembly. A flexible conductor is used to provide a connection to the coils. The armature is a thin, elongated, low-loss member and is magnetically saturated by the magnetic field available from the magnet. The two coils are differentially coupled to provide common mode rejection. The saturation of the magnetic circuit, the differentially coupled coils and the direct coupling of the magnet to the actuator arm contribute to provide a magnetic tachometer having sufficiently large bandwidth and noise rejection for disk drive applications.

BRIEF DESCRIPTION OF THE DRAWINGS

A better understanding of the present invention may be obtained from the accompanying description used in conjunction with the drawings in which.

DESCRIPTION OF THE PREFERRED EMBODIMENT

Figure 1:
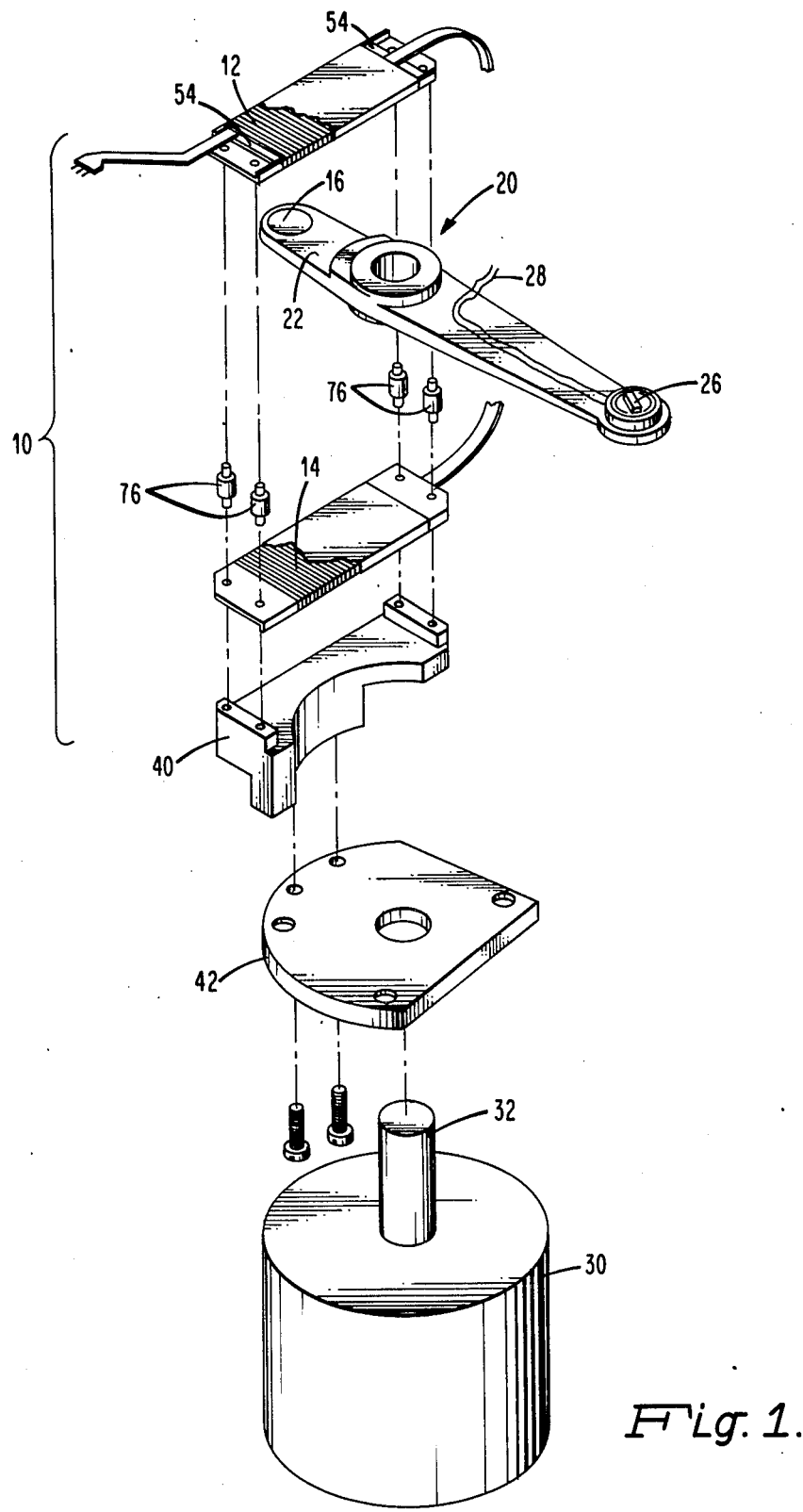
FIG. 1 is an exploded view of the tachometer and arm assembly for the present invention.
Figure 2A:
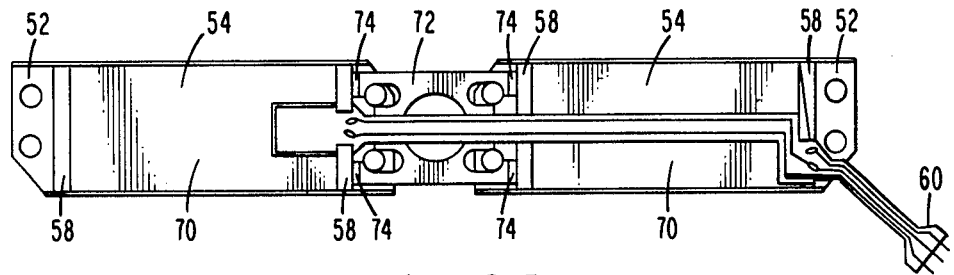
FIGS. 2 A-B are two similar top views of the tachometer coil assembly before and after winding, respectively.
FIG. 2C shows a cross-section of the assembly of FIG. 2B.
FIG. 2D shows a side view of the assembled coil subassembly.
Figure 2B:
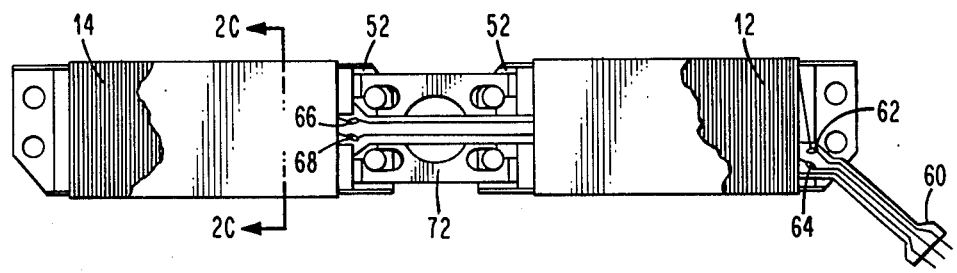
Figure 2C:
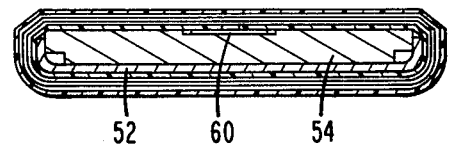
Figure 2D:
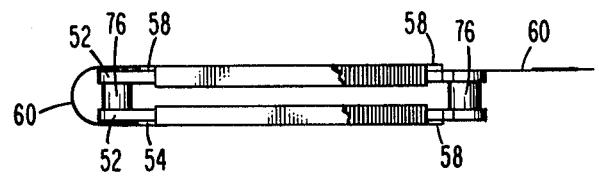

Referring now to FIG. 1, there is shown the tachometer assembly to the present invention. Tachometer assembly 10 will be described in more detail below, suffice it to say for now that is comprises two coils 12 and 14 disposed parallel to each other to define an elongated region therebetween. Within this region there is located a disk-shaped magnet 16 which has the opposite polarity poles on the two opposite surfaces and is imbedded in the counter weight portion 22 of arm 20. Attached to the opposite end of arm 20 is read/write head 26 which is used to read or write magnetically encoded information on one surface of a magnetic disk (not shown). The read/write head 26 has a set of wires 28 running from its magnetic core and coil assembly along the elongated portion 24 of arm 20 for conventional connection to suitable read/write circuitry. Arm 20 is attached to the shaft 32 of rotary servo motor 30. Servo motor 30 rotates the arm 20 through a predetermined arc and therefore positions head 26 at a location corresponding to the desired track on the disk.

Tachometer assembly 10 is fastened to and supported by block 40 which is secured to plate 42. Plate 42 is secured to the casing of servo motor 30 and is used, together with block 40, to support tachometer assembly 10 at an appropriate fixed position with respect to the movable arm. The appropriate position is such that the projected region between the two coils encloses arm magnet 16 throughout the permitted movement range of arm 20.

Referring now also to FIGS. 2 A-D, the tachometer assembly 10 will be discussed in more detail. Each of the two coils 12 and 14 is wound on a corresponding coil support formed by armature plate 52 and filler 54. Armature plate 52 is a thin U-shaped elongated plate of electrical steel. The bent edges forming the U provide the required amount of stiffness to the structure. The area within the U is filled with a slab of plastic filler 54 to support the coils. The two coils 12 and 14 are formed by winding insulated copper wire over a central portion of armature plate 52/filler 54 assembly. To further aid in the containment of the coils, plastic filler 54 includes two end shoulders 58 which extend up to the top surface of the coil to provide an overall flush surface. The electrical connection to the coils is made by using a flexible conductor cable 60. A first conductor is connected to pad 62 where the beginning of the winding of coil 12 is soldered. A second conductor is connected first to pad 64 where the end of the winding of coil 12 is soldered. This second conductor then continues and is connected to pad 66 where the beginning of the winding of coil 14 is also soldered. The third conductor is coupled to pad 68 where the end of the winding of coil 14 is also soldered. The coils 12 and 14 are wound in the same direction with respect to the beginning of their respective windings, and each end of the winding is brought back to a pad, 68 and 64 respectively, adjacent the location of the beginning of windings. The portion of flex cable 60 connected to coil 14 is placed on a suitable longitudinal groove formed in filler 54, and it is held in place by coil 12.

A preferred method of manufacture for tachometer assembly 10 uses a one piece plastic insert 70 having two ends 54, as described above, connected by a central breakaway portion 72. To each of the two ends 54 there is bonded, by conventional means, armature piece 52. Flex connector 60 is then connected to solder pads 62, 64, 66, and 68. To insulate the windings from the armature, a thin sheet of mylar tape is applied over the armature. The coils 12 and 16 are then wound simultaneously and in the same direction starting from solder pads 62 and 66, respectively. At the end of the winding step the coil wire is brought back and soldered to pads 64 and 68 respectively. A further layer of insulation is placed over the coils, for example by using mylar shrink tubing. The wound assembly is now bent causing the center portion 72 of plastic insert 70 to breakaway at four break points 74. The two wound coil subassemblies, now only connected by flex cable 60, are folded, and four cylindrical spacers 76 are used to complete the tachometer assembly. Each spacer 76 has reduced diameter hollow end portions which fit into corresponding holes in armature plate 52 and hold the two coils 12 and 14 at a predetermined separation. A conical swaging tool is used to lock the spacers to the two armatures.

Figure 3A:
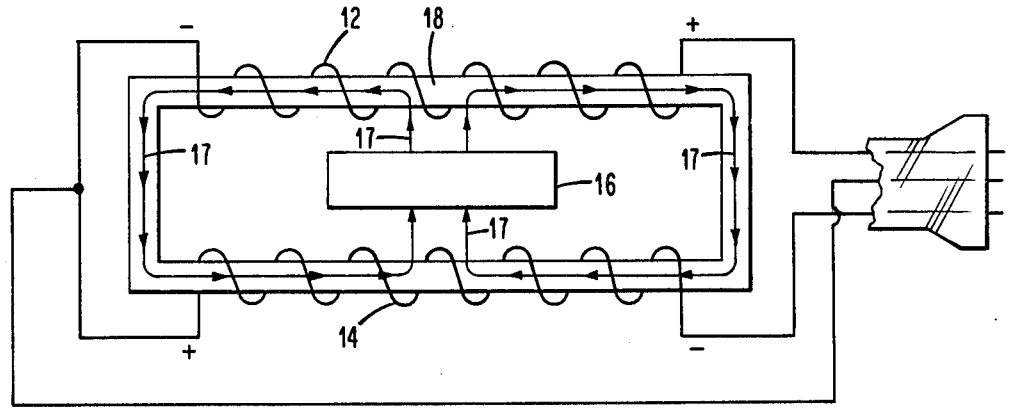
FIG. 3A is a diagrammatic view showing the magnetic and electric circuits for the tachometer assembly of the present invention.
Figure 3B:
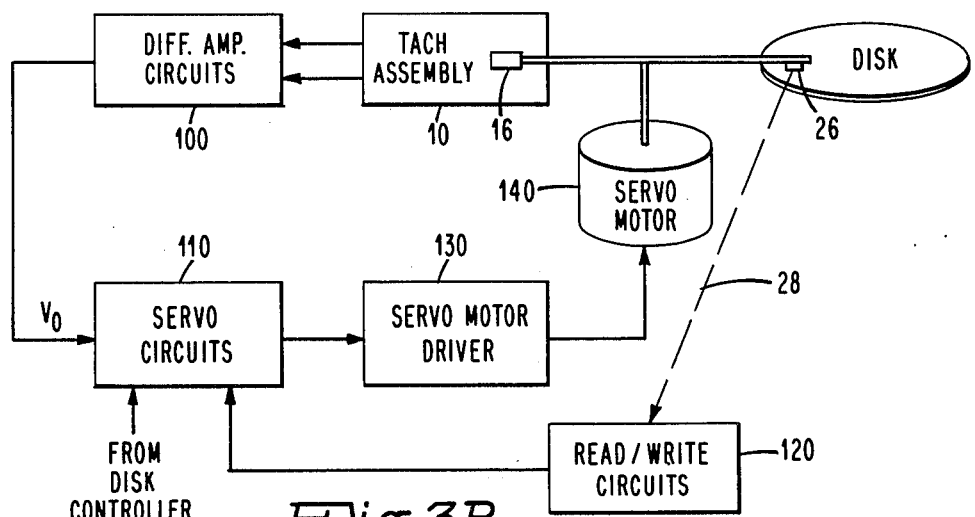
FIG. 3B is a block diagram showing the servo system used to position the actuator.

Referring now to FIG. 3A, there is shown a simplified diagram of the magnet-coils interaction. Magnet 16 provides a predetermined amount of magnetic flux, shown by representative magnetic flux lines 17. The magnetic flux produced by magnet 16 is mostly confined to the closed magnetic circuit depicted as composite armature 18. Armature 18 is actually formed by the two armature 52 in combination with the four spacers 76 (see FIG. 2D). Each armature plate is preferably formed of stock rolled steel and cut so that the direction of mill rolling, i.e. the grain direction, is along the longitudinal axis of the elongated armature plate, for maximizing the permeability of the plate along this axis in order to improve its saturation characteristics. Preferably, magnet 16 is a rare-earth cobalt magnet. The relative values of the magnetic field provided by magnet 16 and the physical dimension of armatures 52 are selected such that the armatures are magnetically saturated. This has the advantage of reducing the sensitivity of the coils to stray magnetic fields, i.e. fields other than that provided by tachometer magnet 16. To further reduce immunity to noise, i.e. stray fields, the two coils 12 and 14 are coupled together in a bucking configuration, that is, for a magnetic field in a direction along the longitudinal axis of the coils, the output of the two coils will cancel. This is achieved, as shown in FIG. 3B, by coupling the output of each coil to a differential amplifier 100 such that its common mode rejection cancels out the signals due to stray fields.

Figure 3C:
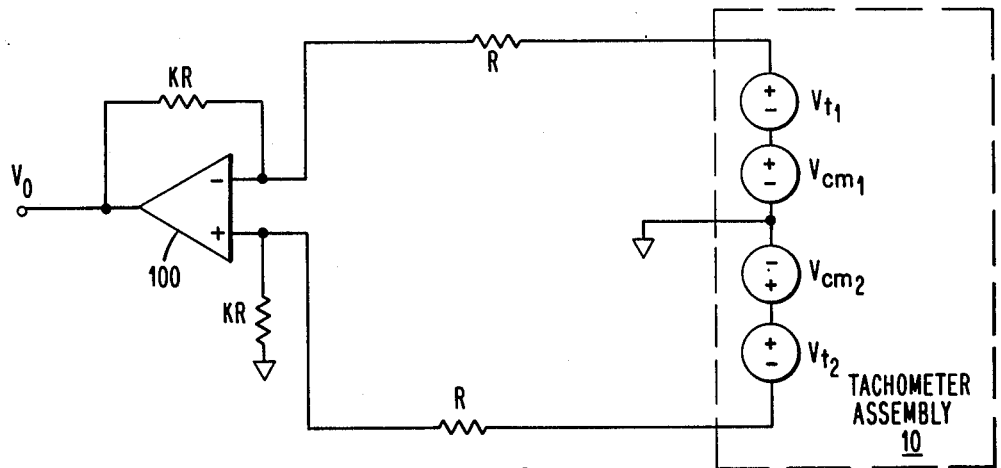
FIG. 3C shows the equivalent circuit for the present tachometer assembly and the electrical circuit used to generate a single velocity signal.

Referring now to FIG. 3C, there is shown the electrical circuit for the tachometer/differential amplifier subsystem. It can be seen that the output voltage $V_o$ of differential amplifier 100 is as follows;

$$V_o = K[(V_{t1} - (-V_{t2})) + (V_{cm1} - V_{cm2})] = K(V_{t1} + V_{t2})$$

where, $V_{t1}$ = voltage output of coil 12 due to tachometer magnet $V_{t2}$ = voltage output of coil 14 due to tachometer magnet $V_{cm1}$ = voltage output of coil 12 from stray field $V_{cm2}$ = voltage output of coil 14 from stray field Thus, the advantage of using a bucking configuration for the two coils is that, in addition to cancelling the noise output, the desired tachometer output from each coil is added. As an aid in reducing noise due to magnetic fields generated by servo motor 30, a magnetic shielding cylindrical sleeve made of a high permeability material may be used around the casing of servo motor 30, although most of the flux lines produced by the servo motor are perpendicular to the longitudinal axis of coils 12 and 14, and thus do not induce a voltage therein.

Using Faraday's Law, it can be seen that the voltage $V_t$ produced in each coil by the magnetic field of magnet 16 is the line integral taken about the electromagnetic circuit, $$V_t = \oint (\vec{V} \times \vec{B}) \cdot d\vec{l}$$

which yields $$V_t = v_m B_m A_m N / b$$

where $v_m$ = velocity of the magnet, $B_m$ = remnant flux density of magnet, $A_m$ = area of magnet, $N$ = number of turns, and $b$ = length of coil. Since the magnet and head are attached to the same pivot:

$$v_m = \dot{\theta} r_m \qquad v_h = \dot{\theta} r_h$$

where $\dot{\theta}$=angular velocity, $r_m$=radius of magnet, $r_h$=radius of head, and $v_h$=velocity of head. Therefore, $$v_m = v_h r_m / r_h$$

which yields $$V_t = v_h(r_m/r_h)(B_m A_m/b)N$$

In one embodiment, the various parameters yield 23 mV/(inch/sec) for each coil. The gain of the system is designed to produce an output voltage $V_o = 0.2$ V (inch/sec).

The path of the magnet within the region between the two coils is actually arcuate, but for the small angular rotation required to position head 26 between its two extreme operational positions this path substantially approximates the longitudinal axis of the tachometer assembly 10, and no correction is found necessary.

The shape of the cross-section of each coil is defined by cross-section of the armature/filler subassembly, and in the preferred embodiment it substantially resembles a very thin rectangle. This has the advantage of providing a very compact and rigid structure while effectively enclosing, in combination with armature 52, substantially all the magnetic flux lines generated by magnet 16.

Referring now back to FIG. 3B, there is shown a block diagram illustrating the arm positioning subsystem of a disk drive. Tachometer magnet 16, carried in the counter weight portion 22 of actuator arm 20, is shown diagramatically being contained within tachometer assembly 10. The output of tachometer assembly 10 is coupled to differential amplifier 100 to produce a signal as a function of the speed of read/write head 26, as explained above. The speed signal thus produced is fed into servo circuit 110. The signals from read/write head 26 are fed to read/write circuit 120, where the embedded servo information is stripped off. The servo data thus produced is fed into servo circuit 110. Servo circuit 110 uses the velocity signal, the embedded servo signals and a selected track signal from a disk controller to generate a control signal used by servo motor driver 130 to control the operation of servo motor 140, which positions arm 20 at the selected track.

The servo circuit 110, which may be of conventional design uses the velocity information to provide a higher servo loop bandwidth, to provide the primary servo signal while the head is seeking the next track, and to provide a secondary position signal. A position signal is obtained in servo circuit 110 by integrating the velocity signal. The velocity signal is also used to determine the arm's position when loading the head, since when the head is not loaded on the disk, and therefore not reading the recorded information, no other servo information is available.

This concludes the description of the preferred embodiment. Modifications to the preferred embodiment will also be apparent to those skilled in the art without departing from the spirit and scope of the present invention. Accordingly, it is intended that this invention be not limited to the embodiments disclosed herein except as defined by the appended claims.

What is claimed is:

1. An arm assembly for use in a disk drive comprising:
   A. arm means for supporting a magnetic transducer for writing data onto and reading data from a disk surface, said arm means being pivotal in a pivot plane about a pivot point, said arm means further supporting a permanent magnet means a selected distance from said pivot point said permanent magnet means generating a magnetic flux;
   B. motor means attached to said arm means for pivoting said arm mean through a selected maximum arc; and
   C. substantially longitudinal electrical coil means having two ends and an axis parallel to said pivot plane, said coil means being positioned to intercept the magnetic flux of said permanent magnet means as said arm means is pivoted through said arc so that the movement of said magnet impresses an electrical potential difference between the ends of said coil means, the angular velocity of said arm means as it is being pivoted by said motor means being related to the impressed potential difference.

2. An arm assembly as defined in claim 1 wherein said coil means comprises a coil disposed about a coil support comprising a high-permeability elongated member, the coil means being positioned such that the magnetic flux generated by said magnet substantially saturates said coil support.

3. An arm assembly as defined in claim 1 wherein said coil means includes a pair of substantially longitudinal wire coils each having an axis parallel to and on opposing sides of pivot plane of said arm means, and further including spacer means for separating said coils by a selected distance to form a slot, with the magnet means moving in the slot.

4. An arm assembly as defined in claim 3 wherein said coils are electrically interconnected so as to provide rejection of common mode signals.

5. An arm assembly as defined in claim 4 wherein each of said coils is disposed about a coil support comprising a thin armature means having an insulating layer, each of said coils being disposed about the respective insulating layer.

6. An arm assembly as defined in claim 1 wherein said permanent magnet means is supported by said arm means so that its magnetization is perpendicular to the pivot plane of said arm means.

* * * * *